Dec. 29, 1925.

F. STITZEL 1,567,400

SPRING WHEEL

Filed Nov. 12, 1923    2 Sheets-Sheet 1

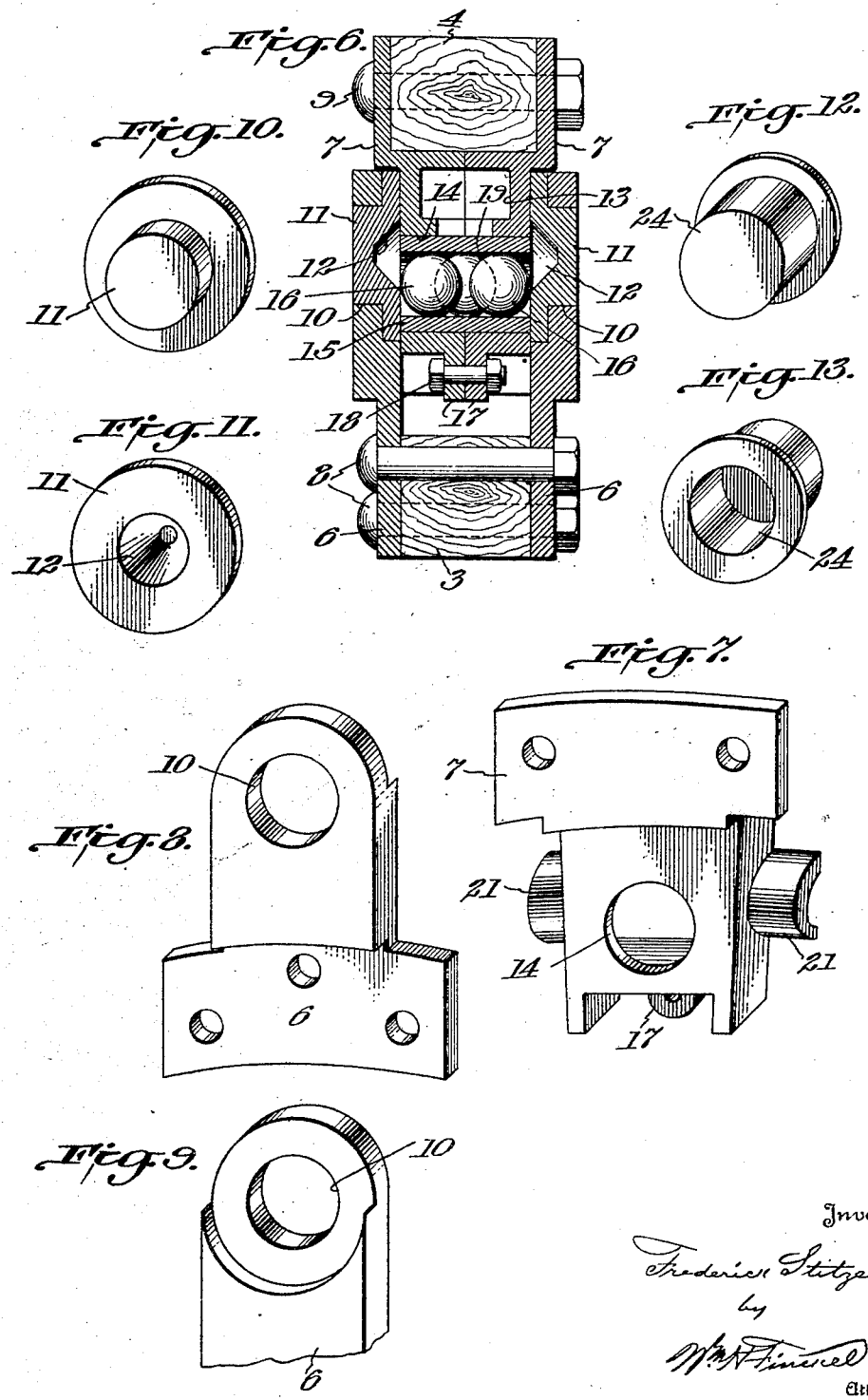

Patented Dec. 29, 1925.

1,567,400

UNITED STATES PATENT OFFICE.

FREDERICK STITZEL, OF LOUISVILLE, KENTUCKY; JOHN J. DAVIS ADMINISTRATOR OF SAID FREDERICK STITZEL, DECEASED.

SPRING WHEEL.

Application filed November 12, 1923. Serial No. 674,263.

*To all whom it may concern:*

Be it known that I, FREDERICK STITZEL, a citizen of the United States, residing at Louisville, in the county of Jefferson and State of Kentucky, have invented a certain new and useful Improvement in Spring Wheels, of which the following is a full, clear, and exact description.

This invention relates to that type of spring wheels illustrated in my Patent No. 1,089,979, granted March 10, 1914, and which is characterized by an inner member carrying the hub and an outer member carrying the tire, these two members being connected axially and circumferentially in such way and by such means that there is possible relative movement between the outer member and the inner member in order to make a resilient wheel which is adapted to yield to pressure, shocks or blows in any usual direction without impairing the integrity of the wheel.

As compared with the wheel of the patent referred to, the present invention replaces the so-called spoke extensions of the patent by interengaging hangers extending outwardly from the inner member and inwardly from the outer member, and ballways the balls in which cooperating with springs interposed between adjacent sets of balls are displaced in a uniform way by the transverse and circumferential movements of the wheel members, all of the springs being pressed equally from both ends and at the same time, as distinguished from the operation in the patent referred to wherein the springs are pressed unequally and mostly from one end, as I will proceed now to explain and finally claim.

In the accompanying drawings illustrating the invention, in the several figures of which like parts are similarly designated, Figure 1 is an elevation of half of a spring wheel. Fig. 2 is a section taken in the plane of line 2—2 of Fig. 3, and Fig. 3 is a section taken in the plane of line 3—3 of Fig. 2. Fig. 4 is a section taken in the plane of line 4—4 of Fig. 2. Fig. 5 is a perspective view of one form of ballway. Fig. 6 is a cross-section similar to Fig. 3, showing the positions of parts under compression of the springs. Fig. 7 is a perspective view of one of the halves of the hanger of the outer member of the wheel. Fig. 8 is a perspective view of one of the halves of the hanger of the inner member of the wheel, and Fig. 9 is a perspective view of the reverse side of the outer part of said half. Fig. 10 is a perspective view of the bearing, and Fig. 11 is a similar view reversed. Fig. 12 is a perspective view of the flanged cap, and Fig. 13 is a similar view reversed.

The hub 1, spokes 2, and circular part or rim 3 constitute the inner member, while the rim or felly 4 and tire 5 constitute the outer member.

The inner and outer members are connected by interengaging pairs of hangers 6 and 7 extending toward one another from the inner and outer members and secured as by bolts and nuts 8 and 9, respectively, to said members. The hangers 6 are provided with transverse holes 10, forming seats in which are arranged the bearings 11 having the conical bearing cavities 12. The hangers 7 are three-sided so as to embrace opposite sides and the inner periphery of the rim 4, and extending from the rim engaging parts inwardly toward the inner wheel member are bearing pieces 13 pierced transversely at 14 to receive a ballway 15 of any desired shape to receive and permit of the displacement of a plurality of balls 16, here shown as four. The inner ends of the inward extensions of the hangers 7 are preferably flanged, as at 17, and rigidly connected by a bolt 18 or other suitable means.

The ballway 15 has an axial raceway 19 alined with the cone bearings, and the said ballway has another raceway 20 intersecting the raceway 19 and extending circumferentially of the wheel.

21 are bearing pieces formed as extensions of the halves of the hangers 7 and shouldered to receive the ballway 15, and in these bearing pieces are placed piston-like blocks 22 preferably provided with packing rings 23, and these bearing pieces are enclosed in flanged caps 24 which afford bearings for the circumferentially arranged springs 25 which may be left exposed or be encased as in the patent previously referred to.

For purposes of differentiation, the balls 16 that are arranged to contact with the piston-like blocks 22 are herein referred to as circumferential balls, while the balls that cooperate with the conical bearings are herein referred to as the axial balls.

With a wheel built in accordance with the foregoing it will be understood that when there is no substantial disturbance of the relations between the outer wheel member and the inner wheel members, these members are substantially concentric, and the springs are compressed so as to sustain the car and its load, with the various parts in adjusted position, see Fig. 4, the circumferential balls meeting and thereby forcing the axial balls into their seats. Should the wheel drop into a hole in the road or strike an obstruction, the inner member will sink and thereby the axial balls will be forced between the circumferential balls which in turn will press against the piston-like blocks 22 and these blocks will press against the caps 24 and so transmit the force against the springs and further compress them. Thereafter when the wheel strikes the level road the springs will react and press against the caps and these press upon the blocks 22 and move them toward one another and move the circumferential balls into contact with one another and place the axial balls in their seats. Thus the weight of the vehicle and its load is always on the axial balls. It is noted, further, that in the arrangement of the springs 25 and the balls, all of the springs are pressed equally from both ends and at the same time.

The packing of the piston-like blocks is resorted to in order to prevent the leakage of lubricant used in the ballway.

Variations in the details of construction and arrangement of parts are permissible within the principle of the invention and the scope of the claims following.

What I claim is:—

1. A spring wheel, having an inner member and an outer member, a series of interconnecting hangers, ballways supported in these hangers and each ballway containing a pair of balls movable in the direction of the circumference of the wheel and another pair of balls movable in the direction of the axis of the wheel by displacement.

2. A spring wheel, having an inner member and an outer member, a series of interconnecting hangers, ballways supported in these hangers and containing pairs of balls movable in the direction of the circumference of the wheel and other pairs of balls movable in the direction of the axis of the wheel by displacement, and springs exerting their pressure against the circumferentially arranged balls and thereby tending to displace the axial balls.

3. A spring wheel, having an inner member and an outer member, a series of interconnecting hangers, ballways supported in these hangers and containing pairs of balls movable in the direction of the circumference of the wheel and other pairs of balls movable in the direction of the axis of the wheel by displacement, piston-like blocks arranged in the ballways and in contact with the circumferentially arranged balls therein, and springs arranged to exert their pressure on the circumferentially arranged balls through said blocks.

4. A spring wheel, having an inner member and an outer member, a series of interconnecting hangers, ballways supported in these hangers and containing pairs of balls movable in the direction of the circumference of the wheel and other pairs of balls movable in the direction of the axis of the wheel by displacement, piston-like blocks slidably mounted in the ballways opposite the circumferentially arranged balls, flanged caps enclosing said blocks, and springs mounted to press against said caps.

5. A spring wheel, having an inner member and an outer member, a series of interconnecting hangers, ballways supported in these hangers and having intersecting raceways, balls arranged in said raceways circumferentially and axially, cone bearings in the hangers for said axially arranged balls, piston-like blocks for the circumferentially arranged balls, caps covering said blocks, and circumferentially arranged springs exerting their pressure on the blocks through the caps.

6. A connecting medium for the inner and outer members of a spring wheel, same comprising interconnected hangers applicable to the inner and outer members, means in said hangers to receive a ballway, said ballway having intersecting raceways, balls arranged in said raceways, and means to movably confine the balls in the ballway and to permit their displacement under pressure.

7. A connecting medium for the inner and outer members of a spring wheel, same comprising interconnected hangers extending outwardly from the inner member, and inwardly from the outer member and respectively having seats for ball bearings and a bearing for a ballway, combined with said ball bearings having ball-receiving conical cavities, and said ballway having intersecting raceways, balls arranged in said raceways, and means including springs to movably confine the balls in the ballway under pressure of the springs.

In testimony whereof I have hereunto set my hand this 9th day of November A. D. 1923.

FREDERICK STITZEL.